United States Patent [19]

Gaylord

[11] Patent Number: 4,506,056
[45] Date of Patent: Mar. 19, 1985

[54] MALEIC ANHYDRIDE-MODIFIED POLYMERS AND PROCESS FOR PREPARATION THEREOF

[75] Inventor: Norman G. Gaylord, New Providence, N.J.

[73] Assignee: Gaylord Research Institute Inc., New Providence, N.J.

[21] Appl. No.: 389,825

[22] Filed: Jun. 18, 1982

Related U.S. Application Data

[63] Continuation-in-part of Ser. No. 385,753, Jun. 7, 1982, abandoned.

[51] Int. Cl.$^3$ .................. C08F 255/00; C08F 263/00; C08F 259/04; C08F 279/02
[52] U.S. Cl. .................................... 524/445; 525/244; 525/255; 525/256; 525/259; 525/261; 525/263; 525/264; 525/265; 525/260; 525/273; 525/285; 525/301; 524/531
[58] Field of Search ............... 525/259, 256, 301, 285, 525/255, 261, 264; 524/445, 531

[56] References Cited

U.S. PATENT DOCUMENTS

| | | | |
|---|---|---|---|
| 3,432,577 | 3/1969 | Serniuk | 525/301 |
| 3,646,165 | 2/1972 | Favie et al. | 525/301 |
| 3,868,433 | 2/1975 | Bartz | 260/876 R |
| 3,886,234 | 5/1975 | Ishihara et al. | 260/878 R |
| 4,146,590 | 3/1979 | Yamamoto et al. | 525/184 |
| 4,358,564 | 11/1982 | Ames | 525/301 |
| 4,382,128 | 5/1983 | Li | 524/513 |

Primary Examiner—Carman J. Seccuro
Attorney, Agent, or Firm—Lawrence Rosen

[57] ABSTRACT

A process for the preparation of carboxyl-containing polymers comprising mixing together maleic anhydride, a free radical initiator, an additive which inhibits the homopolymerization of maleic anhydride but not that of methyl methacrylate below about 100° C. and a polymer, above its melting point, in the absence of a solvent. The process yields anhydride-containing polymers without the substantial crosslinking or degradation which characterize the process in the absence of the additive.

69 Claims, No Drawings

MALEIC ANHYDRIDE-MODIFIED POLYMERS AND PROCESS FOR PREPARATION THEREOF

Continuation-in-part of Ser. No. 385,753, filed June 7, 1982, now abandoned.

BACKGROUND OF THE INVENTION

1. Field of Invention

This invention relates to novel polymers containing appended carboxyl groups and a process for the preparation thereof. More particularly, this invention relates to a method for appending carboxyl groups onto polymers by reacting a mixture of maleic anhydride, a free radical catalyst and an additive, with a polymer or copolymer, above its melting point, in the absence of a solvent, and to modified polymer products obtained thereby.

2. Description of the Prior Art

The reaction of maleic anhydride with polymers is well known in the art. The thermal "ene" reaction between an unsaturated polymer and maleic anhydride has been widely used. U.S. Pat. No. 2,973,344 discloses the preparation of modified polyolefins by heating low pressure polyalkene polymers "known to possess non-terminal unsaturation" with maleic anhydride, in the presence or absence of either an inert hydrocarbon solvent and/or a peroxide catalyst. U.S. Pat. No. 3,884,882 discloses the preparation of "adducts" of maleic anhydride and unsaturated elastomeric ethylene-propylene-unconjugated diene terpolymer by reaction at elevated temperatures in the absence of a radical catalyst, e.g. an organic peroxide. The presence of a radical catalyst results in the crosslinking of the elastomer.

The grafting of maleic anhydride onto saturated polymers in the presence of free radicals, either generated by shearing or by heating free radical precursors such as organic peroxides, is also well known in the art. However, reaction in the absence of a solvent results in crosslinking, e.g. in polyethylene or ethylenepropylene copolymer, or degradation, e.g. in polypropylene. U.S. Pat. No. 3,236,917 discloses that the grafting of maleic anhydride onto saturated copolymers of ethylene and an α-olefin, in the presence of a radical initiator at elevated temperatures and in the absence of a solvent, results in the grafting of maleic anhydride onto two chains, thereby crosslinking the copolymer. U.S. Pat. No. 3,862,265 discloses the controlled degradation of polyolefins in an extruder in the presence of a radical catalyst and the concurrent grafting of maleic anhydride onto the base polymer.

Gabara and Porejko (Journal of Polymer Science, A-1, 5, 1547 (1967) reported that when maleic anhydride is grafted onto low density polyethylene film suspended in an acetic anhydride solution containing a free radical catalyst, the film becomes crosslinked. However, reaction in a solvent such as xylene results in appendage of maleic anhydride without crosslinking the polyethylene (S. Parejko, W. Gabara and J. Kulesza, Journal of Polymer Science, A-1, 5, 1563 (1967); D. Braun and U. Eisenlohr, Die Angewandte Makromolekulare Chemie, 55, 43 (1976). U.S. Pat. No. 3,873,643 discloses that after mixing high density polyethylene with maleic anhydride in the presence of a radical catalyst in a Brabender Plasticorder at elevated temperatures, the melt index of the polymer is significantly reduced.

The reaction of molten isotactic polypropylene with maleic anhydride in the presence of a free radical catalyst in a Brabender Plasticorder (F. Ide, K. Kamada and A. Hasegawa, Kobunshi Kagaku, 25, 107 (1968) or in an extruder (I. Sasaki and F. Ide, Kobunshi Ronbunshu, 38, 67 (1981) results in extensive degradation and a decrease in the intrinsic viscosity of the polymer. When the reaction of isotactic polypropylene with maleic anhydride is conducted in solution in xylene in the presence of a peroxide, the extent of degradation is decreased (F. Ide, A. Hasegawa and T. Kodama, Kobunshi Kagaku, 25, 167 (1968).

The use of solvents to prevent the crosslinking or degradation of the polymer which occurs during the reaction with maleic anhydride in the presence of a radical catalyst, requires the use of equipment for solution reactions and the separation and recovery of the solvent as well as the polymer.

Although reduced degradation occurs in the reaction of crystalline polypropylene in particulate form, below the melting point of the polymer, with vapors of maleic anhydride in the presence of a peroxide, as disclosed in U.S. Pat. No. 3,414,551, the extent of reaction is limited by the surface area of the particulate polymer.

The present invention is directed towards an improved process for the preparation of maleic anhydride-modified polymers in the absence of solvents.

SUMMARY OF THE INVENTION

An object of the present invention is to provide a new and novel process for the preparation of carboxyl-containing polymers.

Another object of the present invention is to provide an improved process for the reaction of maleic anhydride with molten polymers in the absence of solvents.

A further object of the invention is to provide a process for the reaction of maleic anhydride with molten polymers in the presence of radical catalysts, with the total absence or controlled amounts of crosslinking or degradation of the polymers.

It has now been found that the reaction of maleic anhydride with molten polymers, in the presence of a free radical catalyst and nitrogen, phosphorous, or sulfur-containing compounds which do not copolymerize with maleic anhydride but inhibit its homopolymerization and not that of methyl methacrylate below about 100° C., results in the formation of carboxyl-containing polymers without significant crosslinking or degradation or with controlled amounts thereof.

DETAILED DESCRIPTION OF THE INVENTION

The homopolymerization of a vinyl monomer containing carbon-carbon unsaturation is readily initiated in the presence of a free radical precursor when the latter undergoes thermal decomposition. Thus, methyl methacrylate containing a free radical catalyst or initiator such as benzoyl peroxide, t-butyl peroxypivalate, di-sec-butyl peroxydicarbonate or azobisisobutyronitrile is converted to poly(methyl methacrylate) when the mixture is maintained at a temperature of 80°–100° C. Polymerization is inhibited or prevented when radical scavengers are present. The latter react with the radicals generated by decomposition of the catalyst, before the radicals can react with the monomer to initiate polymerization, or react with monomer radicals before they can add additional monomer molecules. Typical inhibitors include phenols such as di-t-butyl-p-cresol and hydroquinone, quinones such as benzoquinone, amines such as phenyl-β-naphthylamine, and various heterocyclic compounds, including phenothiazine, which are well known to those skilled in the art.

Radical scavengers which inhibit the polymerization of methyl methacrylate also inhibit the polymerization of other unsaturated monomers, such as ethyl acrylate, styrene, acrylonitrile and the like.

Surprisingly, it has now been found that certain nitrogen-, phosphorous- and sulfur-containing compounds which do not inhibit the polymerization of methyl methacrylate, and are not considered to be radical scavengers or inhibitors by those skilled in the art, do inhibit the homopolymerization of maleic anhydride at 80°–100° C., without copolymerization therewith. Even more surprising, it has now been discovered that when these nitrogen-, phosphorous- and sulfur-containing compounds are present during the reaction of maleic anhydride with molten polymers in the presence of a free radical initiator, the crosslinking or degradation of the polymer, which normally occurs concurrently with the reaction or graft copolymerization of maleic anhydride, is suppressed. Still more surprising, it has now been discovered that in the presence of these nitrogen-, phosphorous- and sulfur-containing compounds which inhibit the homopolymerization of maleic anhydride below about 100° C., the product of the reaction of maleic anhydride and a molten polymer in the presence of a free radical initiator contains appended maleic anhydride moieties, i.e. the process leads to the preparation of carboxyl-containing maleic anhydride-modified polymers without concurrent extensive crosslinking or degradation of the polymer.

The substrate polymers which may be used in the practice of this invention include but are not limited to polymers derived from one or more of the following monomers: ethylene, propylene, butenes, higher α-alefins including styrene, vinyltoluene and α-methylstyrene, allyl esters and halides, e.g. allyl acetate and allyl chloride, vinyl esters and halides, e.g. vinyl acetate and vinyl chloride, alkyl vinyl ethers, acrolein, acrylic acid, methacrylic acid, acrylonitrile, methacrylonitrile, linear, branched and cyclic alkyl or aryl esters of acrylic acid and methacrylic acid, acrylamide, methacrylamide and the like. The polymers may be linear or branched and of low or high molecular weight.

Polymers which are of particular interest are those normally prepared with metallic or organometallic compounds and/or metal halides as catalysts and thus preclude the use of polar compounds, and particularly carboxyl-containing compounds, as comonomers. Similarly, polymers whose production procedures and facilities are well established and where incorporation of an acidic monomer would present undesirable corrosion problems are particular candidates for modification by the process of the present invention. Further, polymers normally prepared in an aqueous medium, e.g. by emulsion or suspension polymerization, are candidate substrate polymers since maleic anhydride is converted to unreactive maleic acid in water and can not normally be used in copolymerization in an aqueous medium.

The polymers which may be used include homopolymers of ethylene, prepared under either low pressure, i.e. linear or high density polyethylene, or high pressure, i.e. branched or low density polyethylene, amorphous atactic polypropylene or crystalline isotactic polypropylene, poly-1-butene, polyisobutylene, homopolymers and copolymers of higher α-olefins, copolymers of ethylene with propylene, i.e. poly(ethylene-co-propylene) rubber (EPR), which may contain up to 5% of an unconjugated diene or triene (EPDM), as well as high ethylene or high propylene random or block copolymers, copolymers of ethylene with 1-butene or higher α-olefins including "linear low density polyethylene", copolymers of propylene with 1-butene and higher α-olefins, as well as copolymers of higher α-olefins with each other.

Polymers containing up to about 5% unsaturation as well as saturated polymers may be used.

The copolymers of ethylene and other α-olefins with vinyl esters of linear or branched carboxylic acids having 1–24 carbon atoms, and acrylic and methacrylic esters of linear, branched or cyclic alkanols having 1–28 carbon atoms, are also useful in the practice of this invention. Homopolymers and copolymers of the vinyl, methacrylic and acrylic esters with each other and with other polar monomers are also useful.

The homopolymers and copolymers of ethylene, α-olefins and polar monomers may be random, alternating, block or graft copolymers. Homogeneous or multiphase blends or grafts of homopolymers and copolymers may be used when desired, e.g. blends of isotactic polypropylene and either crosslinked or uncrosslinked or partially crosslinked poly(ethylene-co-propylene) or poly(ethylene-co-propylene-co-unconjugated diene), frequently referred to as "thermoplastic elastomers", blends of polypropylene and poly-1-butene or polyisobutylene, blends of low density polyethylene and either poly(ethylene-co-vinyl acetate), poly(ethylene-co-propylene) or "linear low density polyethylene", i.e. ethylene-α-olefin copolymers, polybutadiene-g-(methyl acrylate-co-acrylonitrile) and others well known to those skilled in the art.

Modified polymers obtained by chemical modification of primary polymers are also effective substrate polymers, e.g. chlorosulfonated polyethylene, chlorinated polyethylene, chlorinated poly(vinyl chloride), oxidized polyethylene, hydrogenated diene copolymers and the like.

Thermoplastic ring opening, polyaddition and condensation homopolymers and copolymers are equally effective substrate polymers. Thus, poly(ethylene oxide), polyurethanes, epoxy resins and silicone elastomers are typical useful substrate polymers. Thermoplastic naturally occurring polymers and polymers obtained by chemical modification of naturally occurring polymers may also be used.

Maleic acid may be used in lieu of maleic anhydride in reactions carried out at about 140° C. or at higher temperatures since the acid is converted to the anhydride under these conditions.

The free radical initiators or catalysts which are useful in the practice of this invention have half-lives of less than 3 hours at the reaction temperature and include acyl peroxides such as benzoyl peroxide, dialkyl or aralkyl peroxides such as di-t-butyl peroxide, dicumyl peroxide, cumyl butyl peroxide, 1,1-di-t-butyl peroxy-3,5,5-trimethylcyclohexane, 2,5-dimethyl-2,5-di-t-butylperoxyhexane and bis(α-t-butyl peroxyisopropylbenzene), peroxyesters such as t-butyl peroxypivalate, t-butyl peroctoate, t-butyl perbenzoate, 2,5-dimethylhexyl-2,5-di(perbenzoate), t-butyl di(perphthalate), dialkyl peroxymonocarbonates and peroxydicarbonates, hydroperoxides such as t-butyl hydroperoxide, p-menthane hydroperoxide, pinane hydroperoxide and cumene hydroperoxide and ketone peroxides such as cyclohexanone peroxide and methylethylketone peroxide as well as azo compounds such as azobisisobutyronitrile. Any free radical initiator having the desired half-life at the reaction temperature may be used. More detailed compilations of free radical initiators which may be used are set forth at pages II-3 to II-51 of "Polymer Handbook", Interscience Publishers (1966) and pages 696–700 of volume 58, "Modern Plastics Encyclopedia" (1981–82), the disclosures of which are incorporated herein by reference.

The additives which are effective in reducing the crosslinking or degradation which occurs during the radical catalyzed reaction of maleic anhydride and a molten polymer are characterized by their ability to inhibit the homopolymerization of maleic anhydride below about 100° C. but not that of methyl methacrylate, in the absence of a solvent.

Effective additives include various nitrogen-, phosphorous- and sulfur-containing compounds.

Effective nitrogen-containing compounds include but are not limited to unsubstituted or substituted carboxylic acid amides and lactams, N,N-disubstituted aromatic amines and amine-N-oxides. The following representative compounds are meant to be illustrative rather than limiting: propionamide, stearamide, ethylene bis(stearamide), N-methylacetamide, N,N-dimethylformamide, N,N-dimethylacetamide, N,N-diethyldodecanamide, N,N-diethyl-m-toluamide, caprolactam, 2-pyrrolidone, N-methylpyrrolidone, N,N-dimethylaniline and 2,6-dimethylpyridine-N-oxide.

Although aliphatic and aromatic amides are effective in the practice of the present invention, $\alpha,\beta$-unsaturated amides such as acrylamide and methacrylamide are ineffective in inhibiting maleic anhydride homopolymerization and in suppressing crosslinking during the radical catalyzed reaction of maleic anhydride with a molten polymer. However, N,N-dimethylacrylamide is effective. Imides, nitriles and urea are ineffective.

Effective phosphorous-containing compounds include but are not limited to esters and amides of unsubstituted and/or substituted phosphorous, phosphoric, phosphonous, phosphinous, phosphonic and phosphinic acids, as well as phosphine oxides. The following compounds are meant to be illustrative rather than limiting: diphenyl phosphite, triethyl phosphite, triphenyl phosphite, decyl diphenyl phosphite, tri(mixed nonylphenyl and dinonylphenyl)phosphite ("Polygard", Naugatuck Chemical Co.), triphenyl phosphate, triethyl phosphate, tri(butoxyethyl)phosphate, hexamethylphosphoramide, dimethyl methylphosphonate, triphenylphosphine oxide, etc.

Effective sulfur-containing compounds include but are not limited to various disulfides and sulfoxides. The following representative compounds are illustrative but not limiting: aromatic disulfides such as p-tolyl disulfide, heterocyclic disulfides such as 2-benzothiazyl disulfide, sulfoxides such as dimethyl sulfoxide and the like. Sulfonamides, aroyl disulfides and sulfones are ineffective.

Although various nitrogen-, phosphorous- and sulfur-containing compounds have been disclosed hereinabove as effective in the practice of this invention, it is to be understood that these are only representative of the effective compounds which are characterized by their ability to inhibit the bulk homopolymerization of maleic anhydride but not that of methyl methacrylate at or below about 100° C. Nitrogen-, phosphorous- and sulfur-containing compounds which do not possess this characteristic are excluded from this invention.

Due to the high molecular weight of some additives, e.g. stearamide, the large amounts which may be needed, may result in plasticization, leading to improved processability and/or decreased modulus of the product. In order to optimize the processing and the properties of the product, a mixture of two or more additives may be used in the practice of the process of this invention.

In the practice of the present invention, a mixture of maleic anhydride, free radical initiator and additive is mixed with the polymer at a reaction temperature above the polymer softening point or above the temperature where it undergoes deformation and is converted to a molten or fluid state.

The polymer and the mixture of reactants are subjected to mechanical deformation in a suitable mixing device, such as a Brabender Plasticorder, a roll mill, a single or multiple screw extruder or any other of the well-known mechanical mixing equipment normally used in the mixing, compounding, processing or fabrication of low or high molecular weight thermoplastic, elastomeric or thermosetting polymers or mixtures thereof. An extruder having one or more ports is a particularly desirable reaction vessel, although it is by no means necessary.

The solid polymer, e.g. pellets or powder, may be premixed with the maleic anhydride, initiator and additive, and the resultant mixture added to the mixing device. Alternatively, the mixture of reactants may be added to the molten polymer.

The mixture of maleic anhydride, radical initiator and additive is prepared in the conventional manner and may be in the form of a mixture of powdered solids when all of the ingredients have melting points above room temperature, a slurry or paste when the additive and/or the catalyst are liquids at room temperature, or a liquid or fluid when the maleic anhydride is soluble in the liquid additive and/or catalyst. Alternatively, the powder, slurry or paste may be converted to a liquid by heating above the melting point of maleic anhydride and/or the other components, or by the addition of the small amount of solvent needed to dissolve the solid components.

The mixture is dropped continually or intermittently onto the surface of the polymer undergoing deformation, e.g. in a Brabender Plasticorder, rubber mill, roll mill or extruder. When the mixture is solid, it may be added mechanically, e.g. from a hopper, or may be blown in with an inert gas. When the mixture is a paste, slurry or fluid, it may be added mechanically or may be pumped and sprayed onto the surface of the polymer, e.g. on a roll mill, or may be pumped and injected into one or more ports in an extruder. The numerous methods of adding solids, slurries, pastes or liquids to reaction vessels, mills and extruders are well known to those skilled in the art and may be used in the practice of this invention.

The mixture is generally added continuously or in several portions over a period of time to promote homogeneous distribution of carboxyl groups throughout the mass of the polymer. The carboxylation reaction is extremely rapid and occurs to a major extent when the mixture comes in contact with the heated polymer. However, the reaction can continue when the molten polymer is conveyed away from the point of injection, particularly if the catalyst half-life is at least 10 seconds at the reaction temperature.

An extruder containing an entry port for the addition of the polymer, one or more reduced pressure zones with injection orifices at points where the polymer is molten for addition of the reactant mixture, and a reduced pressure zone for venting off any unreacted maleic anhydride or volatiles formed during the process, may be used advantageously in the practice of this invention. In this case, the extrudate may be removed as ribbon or rod and cut into pellets or as fiber or extruded or blown film. The film may be utilized as a self-supporting film or may be extrusion laminated to a substrate such as paper, aluminum foil or an unoriented or oriented polymeric film, or may be coextruded with a thermoplastic polymer to form a laminate.

The carboxylated polymer may be freed of unreacted maleic anhydride, if any, by solution in a suitable solvent and precipitation in a non-solvent, e.g. hydrocarbon polymers may be dissolved in refluxing xylene and precipitated in acetone or methyl ethyl ketone.

Unreacted maleic anhydride may also be removed from the polymer by treatment with water. The anhydride groups appended to the polymer are converted to carboxylic acid groups on hydrolysis and, if desired, may be regenerated by heating to eliminate water.

The carboxyl content of the final maleic anhydride-modified polymer may be varied from less than 0.1 to 25 percent by weight of the polymer or copolymer by adjustment of the reactant quantities. The maleic anhydride content of the reaction mixture may be varied between 0.1 and 25% of the weight of the polymer.

The concentration of free radical initiator is generally between 0.5 and 100% of the weight of the maleic anhydride. The susceptibility of the molten polymer to crosslinking, e.g. low density polyethylene, or degradation, e.g. isotactic polypropylene, is dependent upon its chemical structure. Since the crosslinking or degradation of the molten polymer may occur in the presence of the free radical initiator alone and is increased when maleic anhydride is also present, the concentration of free radical initiator is selected so as to minimize but not necessarily to eliminate these reactions when undesirable.

The nitrogen-, phosphorous- or sulfur-containing additive is generally used at a concentration of 0.5 to 100 mole-% of the concentration of maleic anhydride, and preferably from about 0.5 to 50 mole-%. The actual amount of additive required is a function of the concentrations of both maleic anhydride and free radical initiator and the susceptibility of the polymer to crosslinking or degradation. When controlled crosslinking is desirable, e.g. to increase the tensile strength of an elastomer, or when controlled degradation is desirable, e.g. to increase the processibility of polypropylene, the amount of additive may be reduced.

The extent of crosslinking in the reaction product is determined by heating a portion of the product in refluxing solvent. Xylene is the preferred solvent for hydrocarbon and xylene-soluble polymers, including polyethylene, polypropylene, poly(ethylene-co-propylene), poly(ethylene-co-vinyl acetate), poly(ethylene-co-methyl acrylate) and the like. After the sample has been heated in refluxing solvent for 4–5 hours, the resultant hot solution or suspension is filtered into acetone or other non-solvent to separate the insoluble gel from the soluble polymer.

The maleic anhydride content of the fractions is determined by treatment with methanolic KOH in refluxing xylene and back titration with isopropanolic HCl, by a calibrated infrared spectroscopic method, or by oxygen analysis.

Our invention will be illustrated in greater detail by the specific examples presented hereinafter, but it is to be understood that these are illustrative embodiments and the invention is not to be limited by any of the details of description but rather is to be construed broadly within its spirit and scope.

Example 1 describes the procedures and results which distinguish the additives which are effective in the process of this invention from those which are ineffective.

EXAMPLE 1

A. The homopolymerization of maleic anhydride was carried out by weighing 0.98 grams (10 mmoles) maleic anhydride and 1 mmole of an additive into a 20 ml vial. The vial was capped with a self-sealing rubber septum and immersed in an 80° C. constant temperature bath. A total of 0.117 grams (0.5 mmole) di-sec-butyl peroxydicarbonate was injected into the vial in 4 equal portions over a 10 minute period, through a hypodermic syringe needle inserted through the septum. The vial was kept in the 80° C. bath for 5 minutes after the 10 minute addition period and then removed and cooled to room temperature. After 2 ml acetone was added to the vial to dissolve the poly(maleic anhydride) and unreated maleic anhydride, the solution was filtered to remove the additive when the latter was insoluble in acetone. The poly(maleic anhydride) was precipitated from the acetone solution by the addition of 25 ml chloroform. The polymer was recovered by filtration and dried in vacuo. When the additive was insoluble in maleic anhydride at 80° C., e.g. stearamide, the polymerization was carried out at 100° C.

B. The homopolymerization of methyl methacrylate was carried out with 0.98 grams (9.8 mmoles) methyl methacrylate, 1 mmole additive and 0.117 grams (0.5 mmole) di-sec-butyl peroxydicarbonate at 80° C., in the same manner as in the homopolymerization of maleic anhydride. The poly(methyl methacrylate) and unreacted methyl methacrylate were dissolved in 7 ml acetone, the solution was filtered and the polymer was precipitated by the addition into 40 ml methanol. The polymer was recovered by filtration and dried in vacuo.

C. Low density polyethylene (LDPE) pellets having a melt index of 7 were charged into the mixing chamber of an electrically heated Brabender Plasticorder maintained at 180° C. with mixing screws rotating at 60 rpm. After 2 minutes the 40 gram LDPE charge was molten. A mixture of 4 grams maleic anhydride (MAH), 0.4 grams dicumyl peroxide and 10 mole-% (based on MAH) of additive was added in 4 equal portions at 2 minute intervals. When the additive was a solid, the mixture was added as a powder. When the additive was a liquid, the mixture was either liquid or in the form of a paste. In the latter case, the mixture was warmed to 80° C. and added as a liquid. The reaction mixture was mixed for 2 minutes after the last addition and then quickly removed from the chamber. Charging, mixing and unloading were conducted under a nitrogen atmosphere.

The xylene-insoluble and xylene-soluble fractions were obtained by heating a 5 gram portion of the reaction product in 200 ml refluxing xylene for 4–5 hours, followed by filtration into 600 ml acetone. The xylene-insoluble gel, if any, was washed with hot xylene and dried in vacuo at 60° C. The xylene-soluble, acetone-insoluble polymer was washed with acetone and dried in vacuo.

The maleic anhydride content of the xylene-soluble fraction was determined by heating a 1-2 gram sample in 150 ml refluxing xylene, to dissolve or swell the polymer and then, on conversion of acid to anhydride units, to remove a xylene-water azeotrope in a Dean-Stark tube. The xylene solution or suspension was cooled to about 60° C. and 0.5N methanolic potassium hydroxide was added through the condenser. The mixture was refluxed for 1.5 hours, cooled and titrated with a 0.25N isopropanolic hydrochloric acid solution to a phenolphthalein end point.

The effects of the additives on (A) the homopolymerization of maleic anhydride at 80°-100° C., (B) the homopolymerization of methyl methacrylate at 80° C., and (C) the crosslinking of LDPE and the maleic anhydride (MAH) content of the xylene-soluble fraction of modified LDPE, are summarized in Tables I–III.

The LDPE used in these experiments had a density of 0.918 (Chemplex 1014, Chemplex Co.). Examples A–E in Table I and CC–FF in Table III are outside of the present invention and are included as illustrative of the results obtained in the absence of an additive and from the use of ineffective additives which do not inhibit the homopolymerization of maleic anhydride.

TABLE I

Nitrogen-Containing Compound

| Example | Additive | PMAH % | PMMA % | LDPE-MAH Insoluble % | Soluble % | MAH wt % |
|---|---|---|---|---|---|---|
| A | None | 52 | 95 | 76 | — | — |
| B | Benzonitrile | 46 | 90 | 53 | — | — |
| C | Succinimide | 44 | 75 | 21 | — | — |
| D | Urea | 10 | 37 | 49 | — | — |
| E | Acrylamide | 29 | 80 | 75 | — | — |
| F | Propionamide | 0 | 50 | 0 | 96 | 2.1 |
| G | Stearamide | 0 | 57 | 0 | 96 | 1.2 |
| H | N—Methylacetamide | 0 | 71 | 0 | 96 | 2.0 |
| I | N,N—Dimethylformamide | 0 | 58 | 0 | 97 | 1.3 |
| J | N,N—Dimethylacetamide | 0 | 51 | 0 | 97 | 2.2 |
| K | N,N—Diethyldodecanamide | 0 | 39 | 0 | 94 | 2.8 |
| L | N,N—Diethyl-m-toluamide | 0 | 38 | 0 | 95 | 1.9 |
| M | N,N—Dimethylacrylamide | 0 | 95 | 0 | 100 | 3.7 |
| N | 2-Pyrrolidone | 0 | 36 | 0 | 96 | 1.4 |
| O | Caprolactam | 0 | 65 | 0 | 100 | 3.9 |
| P | N—Methylpyrrolidone | 0 | 42 | 0 | 96 | 1.6 |
| Q | N,N—Dimethylaniline | 0 | 11 | 0 | 100 | 4.2 |
| R | 2,6-Dimethylpyridine-N—oxide | 0 | 53 | 0 | 95 | 3.3 |

TABLE II

Phosphorous-Containing Compounds

| Example | Additive | PMAH % | PMMA % | LDPE-MAH Insoluble % | Soluble % | MAH wt % |
|---|---|---|---|---|---|---|
| S | Diphenyl phosphite | 0 | 63 | 0 | 95 | 1.9 |
| T | Triphenyl phosphite | 0 | 37 | 0 | 100 | 1.8 |
| U | Triethyl phosphite | 0 | 11 | 0 | 100 | 3.1 |
| V | Decyl diphenyl phosphite | 0 | 16 | 0 | 96 | 3.1 |
| W | Tri(mixed nonylphenyl and dinonylphenyl) phosphite | 0 | 68 | 0 | 95 | 1.0 |
| X | Triethyl phosphate | 0 | 66 | 0 | 100 | 3.2 |
| Y | Tri(butoxyethyl) phosphate | 0 | 65 | 0 | 95 | 2.2 |
| Z | Dimethyl methylphosphonate | 0 | 39 | 0 | 94 | 1.5 |
| AA | Hexamethylphosphoramide | 0 | 45 | 0 | 100 | 1.4 |
| BB | Triphenylphosphine oxide | 0 | 53 | 0 | 95 | 1.4 |

TABLE III

Sulfur-Containing Compounds

| Example | Additive | PMAH % | PMMA % | LDPE-MAH Insoluble % | Soluble % | MAH wt % |
|---|---|---|---|---|---|---|
| CC | p-Toluenesulfonamide | 51 | 65 | 26 | — | — |
| DD | N—Ethyl-o-toluenesulfonamide | 48 | 95 | 48 | — | — |
| EE | Dibenzoyl disulfide | 40 | 90 | 49 | — | — |
| FF | Tetramethylene sulfone | 37 | 95 | 56 | — | — |
| GG | p-Tolyl disulfide | 0 | 21 | 0 | 93 | 6.7 |
| HH | 2-Benzothiazyl disulfide | 0 | 31 | 0 | 95 | 4.6 |

TABLE III-continued

| | | Sulfur-Containing Compounds | | | | |
|---|---|---|---|---|---|---|
| | | | | | LDPE-MAH | |
| | | | | | | Soluble |
| Example | Additive | PMAH % | PMMA % | Insoluble % | % | MAH wt % |
| II | Dimethyl sulfoxide | 0 | 47 | 0 | 95 | 6.7 |

As shown in the tables, additives which do not inhibit the radical initiated homopolymerization of either maleic anhydride or methyl methacrylate at or below about 100° C. (Table I, Examples B-E; Table III, Examples CC-FF), when present during the reaction of molten LDPE with maleic anhydride in the presence of a radical catalyst, do not prevent the formation of crosslinked polymer. However, additives which inhibit the radical initiated homopolymerization of maleic anhydride but not that of methyl methacrylate at or below about 100° C. (Table I, Examples F-R; Table II, Examples S-BB; Table III, Examples GG-II) suppress the formation of crosslinked polymer.

The following examples illustrate the application of the process of the present invention to the preparation of maleic anhydride-modified polymers.

Low Density Polyethylene (LDPE)

EXAMPLES 2-7

In the same manner and in the same equipment described in Example 1, a mixture of maleic anhydride (MAH), benzoyl peroxide (BPO) and N,N-dimethylformamide (DMF) was added to 40 grams molten LDPE at 140° or 180° C., in four equal portions at 2 minute intervals with a total reaction time of 10 minutes from the charging of the pellets to the removal of the reaction product from the mixing chamber. The soluble and insoluble fractions were separated in refluxing xylene and analyzed for MAH content by acid number titration, after precipitation in acetone, as described in Example 1. The results are summarized in Table IV. Examples 2, 3, 5 and 6 are outside of the present invention and are included as controls.

TABLE IV

| Ex. | Temp °C. | MAH wt % on PE | BPO wt % on MAH | BPO wt % on PE | DMF mole % on MAH | DMF wt % on PE | Soluble % | MAH wt % | Insoluble % | MAH wt % |
|---|---|---|---|---|---|---|---|---|---|---|
| 2 | 140 | 0 | 0 | 0.25 | 0 | 0 | 100 | | 0 | |
| 3 | | 10 | 2.5 | 0.25 | 0 | 0 | 51 | 2.5 | 44 | 6.4 |
| 4 | | 10 | 2.5 | 0.25 | 2 | 0.15 | 100 | 0.3 | 0 | |
| 5 | 180 | 0 | 0 | 0.25 | 0 | 0 | 100 | | 0 | |
| 6 | | 10 | 2.5 | 0.25 | 0 | 0 | 70 | 1.3 | 25 | 3.1 |
| 7 | | 10 | 2.5 | 0.25 | 2 | 0.15 | 100 | 0.3 | 0 | |

The data in the table show that although 0.25 wt-% BPO does not crosslink LDPE under the conditions indicated, at either 140° C. (Example 2) or 180° C. (Example 5), the presence of MAH results in crosslinking (Examples 3 and 6). However, the presence of DMF eliminates the crosslinking while yielding a soluble LDPE containing appended MAH (Examples 4 and 7).

TABLE II

| | | Phosphorous-Containing Compounds | | | | |
|---|---|---|---|---|---|---|
| | | | | | LDPE-MAH | |
| | | | | | | Soluble |
| Example | Additive | PMAH % | PMMA % | Insoluble % | % | MAH wt % |
| S | Diphenyl phosphite | 0 | 63 | 0 | 95 | 1.9 |
| T | Triphenyl phosphite | 0 | 37 | 0 | 100 | 1.8 |
| U | Triethyl phosphite | 0 | 11 | 0 | 100 | 3.1 |
| V | Decyl diphenyl phosphite | 0 | 16 | 0 | 96 | 3.1 |
| W | Tri(mixed nonylphenyl and dinonylphenyl) phosphite | 0 | 68 | 0 | 95 | 1.0 |
| X | Triethyl phosphate | 0 | 66 | 0 | 100 | 3.2 |
| Y | Tri(butoxyethyl) phosphate | 0 | 65 | 0 | 95 | 2.2 |
| Z | Dimethyl methylphosphonate | 0 | 39 | 0 | 94 | 1.5 |
| AA | Hexamethylphosphoramide | 0 | 45 | 0 | 100 | 1.4 |
| BB | Triphenylphosphine oxide | 0 | 53 | 0 | 95 | 1.4 |

The infrared spectrum of MAH-modified LDPE contains carbonyl absorption peaks at about 5.4μ (weak), 5.65μ (strong) and 5.8–5.9μ (shoulder). The ratio of the areas of the peaks at 5.65μ/7.35μ (1785 cm$^{-1}$/1365 cm$^{-1}$) was in good agreement with the MAH content obtained by titration of the acid number.

EXAMPLES 8-13

In the same manner and in the same equipment described in Example 1, a mixture of MAH, BPO (2 wt-% based on LDPE) and DMF was added to 40 grams molten LDPE at 140° or 180° C., in four portions at 2 minute intervals. The reaction product was fractionated in refluxing xylene and analyzed for MAH content by titration, after the soluble polymer was precipitated in acetone and the insoluble polymer was washed with acetone. The results are summarized in Table V. Examples 8, 9, 11 and 12 are outside of the invention and are included as controls.

The results in Table V show that although 2 wt-% BPO does not crosslink LDPE under the conditions indicated, at either 140° C. (Example 8) or 180° C. (Example 11), the presence of MAH results in crosslinking (Examples 9 and 12). The presence of DMF eliminates the crosslinking (Examples 10 and 13) and yields a soluble LDPE containing appended MAH.

lyst and an additive were added to 40 grams molten LDPE at 130°–180° C. The results of the various reactions, including the solubility in refluxing xylene and the MAH content by titration of the polymer precipitated from the xylene solution with acetone, are summarized in Table VII.

TABLE V

| Ex | Temp °C. | MAH wt % on PE | BPO wt % on MAH | wt % on PE | DMF mole % on MAH | wt % on PE | Soluble % | MAH wt % | Insoluble % | MAH wt % |
|---|---|---|---|---|---|---|---|---|---|---|
| 8 | 140 | 0 | 0 | 2.0 | 0 | 0 | 100 | | 0 | |
| 9 | | 10 | 20 | 2.0 | 0 | 0 | 51 | 7.1 | 45 | 11.4 |
| 10 | | 10 | 20 | 2.0 | 20 | 1.5 | 100 | 1.3 | 0 | |
| 11 | 180 | 0 | 0 | 2.0 | 0 | 0 | 100 | | 0 | |
| 12 | | 10 | 20 | 2.0 | 0 | 0 | 55 | 5.7 | 35 | 7.3 |
| 13 | | 10 | 20 | 2.0 | 20 | 1.5 | 100 | 1.8 | 0 | |

EXAMPLES 14–18

In the same manner and in the same equipment described in Example 1, a mixture of MAH, dicumyl peroxide (DCP) (2 wt-% based on LDPE) and DMF was added to 40 grams molten LDPE at 180° C., in four portions at 2 minute intervals. The results of the fractionation in refluxing xylene and the analysis by titration are shown in Table VI. Examples 14, 15 and 18 are outside of this invention and are included as controls.

TABLE VI

| Ex. | MAH wt % on PE | DCP wt % on MAH | wt % on PE | DMF mole % on MAH | wt % on PE | Soluble % | MAH wt % | Insoluble % | MAH wt % |
|---|---|---|---|---|---|---|---|---|---|
| 14 | 0 | 0 | 2.0 | 0 | 0 | 42 | | 51 | |
| 15 | 10 | 20 | 2.0 | 0 | 0 | 36 | 6.6 | 59 | 8.6 |
| 16 | 10 | 20 | 2.0 | 2 | 0.15 | 62 | 2.9 | 28 | 3.5 |
| 17 | 10 | 20 | 2.0 | 20 | 1.5 | 100 | 2.8 | 0 | |
| 18 | 0 | 0 | 2.0 | 0 | 1.5 | 39 | | 55 | |

The results in Table VI show that 2 wt-% DCP results in extensive crosslinking at 180° C. (Example 14). The presence of MAH increases the extent of crosslinking (Example 15) while the concurrent presence of DMF reduces (Example 16) or eliminates (Example 17) the crosslinking and yields a soluble LDPE with a high MAH content. Example 18 demonstrates that the elimination of crosslinking is not due to the interaction of the additive and the catalyst.

EXAMPLES 19–24

In the same manner and in the same equipment described in Example 1, mixtures of MAH, a radical catalyst and an additive were added to 40 grams molten LDPE at 130°–180° C. The results of the various reactions, including the solubility in refluxing xylene and the MAH content by titration of the polymer precipitated

TABLE VII

| Ex. | Temp °C. | MAH wt % on PE | Catalyst[a] Nature | wt % on MAH | wt % on PE | Additive[b] Nature | mole % on MAH | wt % on PE | Soluble % | MAH wt % |
|---|---|---|---|---|---|---|---|---|---|---|
| 19 | 130 | 10 | tBPO | 10 | 1.0 | DMAC | 11.3 | 1.0 | 100 | 1.2 |
| 20 | 140 | 10 | BPO | 10 | 1.0 | DETA | 10.3 | 2.0 | 100 | 1.9 |
| 21 | 150 | 2 | tBPB | 5 | 0.1 | DMAC | 11.0 | 0.2 | 100 | 0.7 |
| 22 | 180 | 5 | DCP | 10 | 0.5 | DMAC | 11.3 | 0.5 | 100 | 2.6 |
| 23 | 180 | 20 | DCP | 10 | 2.0 | DEDA | 3.8 | 2.0 | 100 | 3.9 |
| 24 | 180 | 20 | DCP | 10 | 2.0 | SA | 3.4 | 2.0 | 100 | 2.4 |

[a]tBPO = t-butyl peroctoate; tBPB = t-butyl perbenzoate
[b]DMAC = N,N—dimethylacetamide; DETA = N,N—diethyl-m-toluamide; DEDA = N,N-diethyldodecanamide; SA = stearamide The results in Table VII show that crosslinking is prevented and carboxyl-containing LDPE is produced using various catalysts and additives.

Poly(Ethylene-co-Vinyl Acetate) (E-VA)

EXAMPLES 25–32

The reaction of 40 grams molten E-VA, containing 9.0 wt-% vinyl acetate (VA), with a mixture of MAH, tBPB and either SA or DETA as additive, was carried out at 140° C. in the same manner and in the same equipment described in Example 1. The mixture of MAH, catalyst and additive was added to the molten E-VA in 4 portions at 2 minute intervals. The reaction product was fractionated into soluble and insoluble fractions in refluxing xylene. The MAH content was determined by titration as described in Example 1, using untreated E-VA as the blank. The results of the various reactions are summarized in Table VIII. Examples 25, 26, 28, 29 and 31 are outside of this invention and are included as controls.

TABLE VIII

| Ex. | MAH wt % on E-VA | tBPB wt % on MAH | wt % on E-VA | Additive Nature | mole % on MAH | wt % on E-VA | Soluble % | MAH wt % | Insoluble % | MAH wt % |
|---|---|---|---|---|---|---|---|---|---|---|
| 25 | 0 | 0 | 0.5 | — | 0 | 0 | 61 | | 33 | |
| 26 | 5 | 10 | 0.5 | — | 0 | 0 | 41 | 1.7 | 56 | 2.0 |

TABLE VIII-continued

| | | MAH | tBPB | | Additive | | Soluble | | Insoluble | |
| | | wt % | wt % | wt % | | mole % | wt % | | MAH | | MAH |
| Ex. | | on E-VA | on MAH | on E-VA | Nature | on MAH | on E-VA | % | wt % | % | wt % |
|---|---|---|---|---|---|---|---|---|---|---|---|
| 27 | | 5 | 10 | 0.5 | SA | 13.7 | 2 | 100 | 2.1 | 0 | |
| 28 | | 0 | 0 | 1.0 | — | 0 | 0 | 30 | | 60 | |
| 29 | | 10 | 10 | 1.0 | — | 0 | 0 | 27 | 2.5 | 66 | 3.9 |
| 30 | | 10 | 10 | 1.0 | SA | 3.4 | 1 | 94 | 7.6 | 0 | |
| 31 | | 0 | 0 | 1.0 | SA | 0 | 1 | 31 | | 66 | |
| 32 | | 10 | 10 | 1.0 | DETA | 5.1 | 1 | 94 | 5.7 | 0 | |

The results in Table VIII show that crosslinking of E-VA occurs in the presence of 0.5 wt-% catalyst (Example 25) as well as 1.0 wt-% catalyst (Example 28), and that the presence of MAH increases the extent of crosslinking (Examples 26 and 29). However, the presence of stearamide (Examples 27 and 30) or DETA (Example 32) suppresses crosslinking while yielding a modified E-VA containing appended MAH units. Example 31 shows that the presence of SA does not prevent crosslinking by the peroxide in the absence of MAH.

The infrared spectrum of MAH-modified E-VA shows carbonyl absorption peaks at about $5.4\mu$ (shoulder) and $5.65\mu$ (strong) due to the presence of appended MAH while the very strong peak at $5.8\mu$ is attributable to the VA carbonyl group.

EXAMPLES 33–36

A mixture of MAH, a radical catalyst and an additive was added over 10 minutes, to 40 grams molten E-VA, containing 9.0 wt-% VA, in a Brabender Plasticorder maintained at 140° or 180° C. The reaction mixture was completely soluble in refluxing xylene and the purified product was isolated by precipitation in acetone. The MAH content of the product was determined by titration, using untreated E-VA as blank. The results of the various reactions are summarized in Table IX. Despite the absence of xylene-insoluble, crosslinked polymer, the values given for the amount of recovered xylene-soluble polymer may be less than 100% due to the difficulty in removing all of the MAH-containing polymer from the flask.

The results in Table IX show that crosslinking is suppressed and MAH-modified E-VA is produced using various catalysts and additives.

EXAMPLES 37–39

The reaction of E-VA, containing 4.5 wt-% VA, with a mixture of MAH, tBPB and either SA or dimethyl sulfoxide (DMSO), was carried out at 140° C. by the addition of the mixture of MAH, catalyst and additive in four portions at 2 minute intervals to 40 grams molten E-VA. The reaction mixture was fractionated in refluxing xylene and the recovered products were analyzed for MAH content by titration, using untreated E-VA as blank. The results are summarized in Table X. Example 37 is outside of this invention and is included as a control.

The results shown in Table X demonstrate the efficiency of both SA (Example 38) and DMSO (Example 39) in suppressing the crosslinking of the E-VA while permitting the reaction of E-VA with MAH.

TABLE X

| | MAH | tBPB | | Additive | | | Soluble | | Insoluble | |
| | wt % | wt % | wt % | | mole % | wt % | | MAH | | MAH |
| Ex. | on EVA | on MAH | on EVA | Nature | on MAH | on EVA | % | wt % | % | wt % |
|---|---|---|---|---|---|---|---|---|---|---|
| 37 | 5 | 10 | 0.5 | — | 0 | 0 | 36 | 1.5 | 60 | 0.9 |
| 38 | 5 | 10 | 0.5 | SA | 13.7 | 2 | 95 | 3.7 | 0 | |
| 39 | 5 | 10 | 0.5 | DMSO | 14.7 | 0.6 | 93 | 3.1 | 0 | |

EXAMPLES 40–41

The reaction of E-VA, containing 2 wt-% VA, with a mixture of MAH and tBPB, in the absence and in the presence of SA, was carried out at 140° C., in the same manner and in the same equipment described in Example 1, by the addition of a mixture of MAH, tBPB and SA, if any, to 40 grams molten E-VA at 140° C. over a 10 minute period. The products were fractionated in refluxing xylene and analyzed for MAH content by titration, using untreated E-VA as blank. The results are summarized in Table XI. Example 40 is outside of this invention and is included as a control.

TABLE VIII

| | | MAH | Catalyst[a] | | | Additive[b] | | | Soluble | |
| | Temp | wt % | | wt % | wt % | | mole % | wt % | | MAH |
| Ex. | °C. | on EVA | Nature | on MAH | on EVA | Nature | on MAH | on EVA | % | wt % |
|---|---|---|---|---|---|---|---|---|---|---|
| 33 | 140 | 10 | BPO | 10 | 1.0 | DETA | 5.1 | 1 | 100 | 8.8 |
| 34 | 140 | 10 | tBPO | 10 | 1.0 | DMAC | 11.3 | 1 | 100 | 5.0 |
| 35 | 140 | 5 | AIBN | 10 | 0.5 | TEPI | 9.8 | 0.8 | 93 | 3.2 |
| 36 | 180 | 5 | tBPB | 10 | 0.5 | TPPO | 15.2 | 2 | 94 | 3.2 |

[a]AIBN = azobisisobutyronitrile
[b]TEPI = triethyl phosphite; TPPO = triphenyl phosphine oxide

TABLE XI

| Ex. | E-VA wt % VA | MAH wt % on EVA | tBPB wt % on MAH | tBPB wt % on EVA | Additive Nature | Additive mole % on MAH | Additive wt % on EVA | Soluble % | Soluble MAH wt % | Insoluble % |
|---|---|---|---|---|---|---|---|---|---|---|
| 40 | 2 | 5 | 10 | 0.5 | — | 0 | 0 | 45 | 1.2 | 50 |
| 41 | 2 | 5 | 10 | 0.5 | SA | 13.7 | 2 | 94 | 2.7 | 0 |

The results shown in Table XI demonstrate the use of SA (Example 41) in eliminating crosslinking during the preparation of MAH-modified E-VA containing 2 wt-% VA.

EXAMPLE 42

The reaction of 40 grams elastomeric E-VA containing 48 wt-% VA, with a mixture of 2 grams (5 wt-% on EVA) MAH and 0.2 gram (0.5 wt-% on EVA) tBPB in the presence of 0.557 gram (14.7 mole-% on MAH, 1.4 wt-% on EVA) triethyl phosphate (TEPA) was carried out at 140° C. by the addition of the mixture of reactants to the molten E-VA in equal portions over a 10 minute period. The reaction mixture, after removal from the mixing chamber of the Brabender Plasticorder, was completely soluble in refluxing xylene and was purified by precipitation in methanol. The infrared spectrum of the MAH-containing E-VA showed the strong broad peak centered at 5.8μ due to the ester carbonyl group and shoulders at 5.4 and 5.6μ due to the MAH carbonyl groups.

The addition of diethylenetriamine to a toluene solution of the MAH-modified E-VA at about 80° C. resulted in rapid gelation due to crosslinking, confirming the presence of multiple anhydride units per chain. In contrast, the untreated E-VA containing 48 wt-% VA remained in solution on the addition of the amine.

Poly(Ethylene-co-Methyl Acrylate) (E-MA)

EXAMPLES 43–45

A mixture of MAH and DCP, in the absence and in the presence of caprolactam (CPL), was added over a 10 minute period to 40 grams molten E-MA, containing 18.8 wt-% methyl acrylate by oxygen analysis (Poly-Eth 2205, Gulf Oil Chemicals Co.), in the Brabender Plasticorder at 180° C. A 5 gram portion of the reaction product was separated into soluble and insoluble fractions by heating in 200 ml refluxing xylene. The soluble fraction was isolated by precipitation in acetone and analyzed for MAH content by reaction with base and back titration with acid, as described in Example 1, using the untreated E-MA as blank. Oxygen analysis indicated an MAH content in acceptable agreement with that obtained by titration. The results are summarized in Table XII. Examples 43 and 44 are outside of this invention and are included as controls.

TABLE XII

| Ex. | MAH wt % on E-MA | DCP wt % on MAH | DCP wt % on E-MA | CPL mole % on MAH | CPL wt % on E-MA | Soluble % | Soluble MAH wt % | Insoluble % |
|---|---|---|---|---|---|---|---|---|
| 43 | 0 | 0 | 1.0 | 0 | 0 | 55 | | 41 |
| 44 | 10 | 10 | 1.0 | 0 | 0 | 44 | 6.4 | 56 |
| 45 | 10 | 10 | 1.0 | 8.6 | 1 | 100 | 1.9 | 0 |

The results shown in Table XII demonstrate that while MAH (Example 44) increases the crosslinking of E-MA resulting from the presence of DCP (Example 43), the presence of CPL in the MAH-DCP mixture suppresses the crosslinking (Example 45). The infrared spectrum of MAH-modified E-MA shows the characteristic carbonyl absorption peaks due to MAH at about 5.4 and 5.65μ and the ester carbonyl peak from MA centered at about 5.8μ.

The addition of diethylenetriamine to a toluene solution of the MAH-modified E-MA prepared in the presence of CPL, resulted in gelation. The addition of zinc acetate to an 80/20 toluene-dimethylformamide solution of the MAH-modified E-MA resulted in crosslinking and precipitation. Untreated E-MA remained in solution on the addition of either the amine or zinc acetate.

High Density Polyethylene (HDPE)

EXAMPLES 46–49

The reaction of high density polyethylene having a density of 0.960 and a melt index of 12.0 (Superdylan 7120, Arco Polymers Inc.), with a mixture of MAH, DCP and stearamide (SA) was carried out by adding the mixture of reactants over 10 minutes to 40 grams molten HDPE in the Brabender Plasticorder at 180° C. A 5 gram aliquot of the reaction product was extracted in 200 ml refluxing xylene for 3 hours. The solution was decanted and, after 100 ml xylene was added to the residual polymer which adhered to the walls of the flask, the mixture was heated under reflux for an additional 2 hours. The xylene-soluble polymer was isolated by precipitation in acetone. The MAH content of the soluble MAH-modified HDPE was determined from the oxygen analysis. The infrared spectra of the MAH-containing HDPE showed the presence of MAH carbonyls at 5.4 and 5.65μ. The results are summarized in Table XIII. Examples 46 and 47 are outside of this invention and are included as controls.

TABLE XIII

| Ex. | MAH wt % on PE | DCP wt % on MAH | DCP wt % on PE | Stearamide mole % on MAH | Stearamide wt % on PE | Soluble % | Soluble MAH wt % | Insoluble % |
|---|---|---|---|---|---|---|---|---|
| 46 | 0 | 0 | 0.5 | 0 | 0 | 100 | | 0 |
| 47 | 5 | 10 | 0.5 | 0 | 0 | 76 | | 17 |
| 48 | 5 | 10 | 0.5 | 6.9 | 1 | 88 | 1.2 | 5 |

TABLE XIII-continued

| Ex. | MAH wt % on PE | DCP wt % on MAH | wt % on PE | Stearamide mole % on MAH | wt % on PE | Soluble % | MAH wt % | Insoluble % |
|---|---|---|---|---|---|---|---|---|
| 49 | 5 | 10 | 0.5 | 13.7 | 2 | 100 | 3.9 | 0 |

The results shown in Table XIII demonstrate that the presence of SA reduces (Example 48) or inhibits (Example 49) the crosslinking of HDPE in the presence of MAH and DCP (Example 47) while permitting the appendage of MAH units.

EXAMPLES 50–52

The reaction of HDPE with MAH, DCP and either triphenyl phosphite (TPPI), triphenyl phosphate (TPPA) or dimethyl sulfoxide (DMSO) was carried out at 180° C. in the same equipment and in the same manner as described in Examples 46–49. The reaction product was completely soluble in refluxing xylene and was precipitated in acetone. The MAH content of the soluble MAH-modified HDPE was determined from the oxygen analysis. The results are summarized in Table XIV.

TABLE XIV

| Ex. | MAH wt % on PE | DCP wt % on MAH | wt % on PE | Additive Nature | mole % on MAH | wt % on PE | Soluble % | MAH wt % |
|---|---|---|---|---|---|---|---|---|
| 50 | 5 | 10 | 0.5 | TPPI | 14.7 | 2.4 | 98 | 1.8 |
| 51 | 10 | 5 | 0.5 | TPPA | 14.7 | 4.7 | 100 | 1.4 |
| 52 | 10 | 10 | 1.0 | DMSO | 15.7 | 1.3 | 100 | 0.8 |

The results in Table XIV show that the phosphorous- and sulfur-containing additives inhibit crosslinking without suppressing the reaction of HDPE with MAH

"Linear Low Density Polyethylene" (LLDPE)

EXAMPLES 53–59

The reaction of a low pressure ethylene-butene-1 copolymer, known as LLDPE, having a density of 0.920 and a melt index of 2, with MAH, DCP and various additives, was conducted in the Brabender Plasticorder at 180° C., by the addition of the additive mixtures to 40 grams molten LLDPE in 4 equal portions at 2 minute intervals. The reaction product was extracted in refluxing xylene to separate the xylene-soluble and xylene-insoluble fractions. The MAH content was obtained from the oxygen analysis. The results are summarized in Table XV. Examples 53 and 54 are outside of this invention and are included as controls.

TABLE XV

| Ex. | MAH wt % on PE | DCP wt % on MAH | wt % on PE | Additive Nature | mole % on MAH | wt % on PE | Soluble % | MAH wt % | Insoluble % |
|---|---|---|---|---|---|---|---|---|---|
| 53 | 0 | 0 | 0.125 | — | 0 | 0 | 92 | | 5 |
| 54 | 5 | 2.5 | 0.125 | — | 0 | 0 | 72 | 1.4 | 24 |
| 55 | 5 | 2.5 | 0.125 | SA | 13.7 | 2 | 93 | 3.9 | 0 |
| 56 | 5 | 2.5 | 0.125 | TDS | 14.7 | 1.9 | 97 | 0.7 | 0 |
| 57 | 5 | 2.5 | 0.125 | TEPA | 14.7 | 1.4 | 97 | 0.6 | 0 |
| 58 | 10 | 1.25 | 0.125 | TEPA | 14.7 | 2.8 | 100 | 1.6 | 0 |
| 59 | 10 | 2.5 | 0.25 | DMSO | 15.7 | 1.3 | 85 | 0.9 | 10 |

The results shown in Table XV demonstrate the increase in crosslinking resulting from the presence of MAH (Example 54) and the suppression of crosslinking, concurrent with the appendage of MAH units, in the presence of the indicated additives.

Polypropylene (PP)

EXAMPLES 60–65

The reaction of crystalline, isotactic polypropylene (PP), having a melt flow rate of 4 at 230° C. and an intrinsic viscosity of 1.8 dl/gram in decahydronaphthalene at 135° C. (Profax 6523, Hercules Inc.), with MAH in the presence of dicumyl peroxide (DCP) was carried out in the Brabender Plasticorder at 180° C. The mixture of MAH, DCP and stearamide (SA) or caprolactam (CPL), when present, was added to 40 gram molten PP over a 10 minute period, under a nitrogen atmosphere. The reaction mixture was purified by solution in refluxing xylene and precipitation inacetone. The precipitated polymer was washed with acetone and dried in vacuo at 60° C.

The intrinsic viscosity of the MAH-modified PP was determined in decahydronaphthalene at 135° C. The melt flow rate (MFR) was measured according to ASTM D-1238-65T at 230° C. The rate of extrusion of polymer in grams per 10 minutes was determined under the 2160 gram combined weight of the piston and its plunger.

The MAH content of the modified PP was determined either from the oxygen content or from the infrared spectrum. A calibration plot was prepared from the ratio of the areas under the absorption peaks at 1785 $cm^{-1}$/840 $cm^{-1}$ and the MAH contents obtained from the acid number titration of two low molecular weight MAH-grafted PPs having MAH contents of 0.85 and 3.8 wt-%. The MAH content of the MAH-modified PP, prepared by the process of this invention, determined from the oxygen content and from the infrared spectra calibration plot were in acceptable agreement.

The results obtained in the presence of 2.5 wt-% MAH and 0.25 wt-% DCP are summarized in Table XVI. Examples 60–63 are outside of this invention and are included as controls.

TABLE XVI

| Ex. | MAH wt % on PP | DCP wt % on MAH | wt % on PP | Additive Nature | mole % on MAH | wt % on PP | PP-MAH MAH wt-% | [η] dl/g | MFR |
|---|---|---|---|---|---|---|---|---|---|
| 60 | 0 | 0 | 0 | — | 0 | 0 | 0 | 1.6 | 18 |
| 61 | 0 | 0 | 0.25 | — | 0 | 0 | 0 | 0.8 | 91 |
| 62 | 0 | 0 | 0.25 | SA | 0 | 3.2 | 0 | 0.8 | 50 |
| 63 | 2.5 | 10 | 0.25 | — | 0 | 0 | 1.2 | 0.8 | 105 |
| 64 | 2.5 | 10 | 0.25 | SA | 45 | 3.2 | 0.7 | 1.6 | 18 |
| 65 | 2.5 | 10 | 0.25 | CPL | 45 | 1.3 | 0.5 | 1.5 | 21 |

Example 60 demonstrates the slight decrease in the intrinsic viscosity and the increase in the MFR when the PP is subjected to mixing in the Plasticorder at 180° C. There is a significantly greater effect due to the presence of DCP (Example 61). The presence of SA and DCP (Example 62) results in the same reduction in intrinsic viscosity but a smaller increase in MFR, than in the presence of DCP alone. The presence of MAH and DCP increases the MFR to an even greater extent than DCP alone while yielding the same low intrinsic viscosity (Example 63). Examples 64 and 65, which are within this invention, show that the presence of SA or CPL in the DCP-MAH mixture results in the preparation of MAH-containing PP without a significant change in intrinsic viscosity or MFR.

EXAMPLES 66–71

The reaction of 40 grams molten isotactic PP with 5 wt-% MAH and 0.25 wt-% DCP in the presence of either dimethyl sulfoxide (DMSO), triethyl phosphate (TEPA), triphenyl phosphite (TPPI), triphenylphosphine oxide (TPPO) or stearamide (SA), was carried out at 180° C. in the same manner as described in Examples 64–65. The results are summarized in Table XVII. Example 66 is outside of the invention and is included as a control.

TABLE XVII

| Ex. | MAH wt % on PP | DCP wt % on MAH | wt % on PP | Additive Nature | mole % on MAH | wt % on PP | PP-MAH MAH wt % | [η] dl/g |
|---|---|---|---|---|---|---|---|---|
| 66 | 5 | 5 | 0.25 | — | 0 | 0 | 1.4 | 0.8 |
| 67 | 5 | 5 | 0.25 | SA | 22.5 | 3.2 | 0.5 | 1.6 |
| 68 | 5 | 5 | 0.25 | DMSO | 22.5 | 0.9 | 1.0 | 1.5 |
| 69 | 5 | 5 | 0.25 | TPPI | 22.5 | 3.6 | 0.6 | 1.5 |
| 70 | 5 | 5 | 0.25 | TEPA | 22.5 | 2.1 | 0.9 | 1.5 |
| 71 | 5 | 5 | 0.25 | TPPO | 22.5 | 3.2 | 0.3 | 1.4 |

Example 66 shows the degradation of PP which occurs in the presence of 5 wt-% MAH and 0.25 wt-% DCP. The remaining data in Table XVII (Examples 67–71) show that the presence of the nitrogen-, phosphorous- and sulfur-containing additives results in the preparation of PP containing appended MA units, without significant degradation.

EXAMPLES 72–77

The modification of 40 grams molten isotactic PP by reaction with 5–10 wt-% MAH and 0.5–2 wt-% DCP in the presence of various additives was carried out at 180° C. in the same manner as described earlier. The results are summarized in Table XVIII. Example 72 is outside of this invention and is included as a control.

TABLE XVIII

| Ex. | MAH wt % on PP | DCP wt % on MAH | wt % on PP | Additive Nature | mole % on MAH | wt % on PP | PP-MAH MAH wt % | [η] dl/g |
|---|---|---|---|---|---|---|---|---|
| 72 | 5 | 10 | 0.5 | — | 0 | 0 | 1.5 | 0.5 |
| 73 | 10 | 5 | 0.5 | SA | 45 | 13 | 0.7 | 1.6 |
| 74 | 10 | 10 | 1.0 | SA | 25 | 7.3 | 1.1 | 1.5 |
| 75 | 10 | 10 | 1.0 | CPL | 45 | 5.3 | 0.7 | 1.8 |
| 76 | 10 | 20 | 2.0 | DMAC | 23 | 2 | 1.0 | 1.6 |
| 77 | 10 | 20 | 2.0 | SA | 11.5 | 3.3 | 1.0 | 1.7 |

Example 72 shows the degradation of PP which occurs in the presence of 5 wt-% MAH and 0.5 wt-% DCP. The remaining results in Table XVIII (Examples 73–77) show that MAH-modified PP can be obtained with high catalyst concentrations in the presence of the indicated additives, without PP degradation.

EXAMPLES 78–80

The reaction of 40 grams molten isotactic PP with 4 grams MAH (10 wt-% on PP) and 0.4 gram t-butyl cumyl peroxide (tBCP) (10 wt-% on MAH, 1 wt-% on PP) in the presence of 0.8 gram dimethylacetamide (DMAC) (23 mole-% on MAH, 2 wt-% on PP) was carried out at 170°–190° C., by the addition of the mixture of reactants to the molten PP in four equal portions at 2 minute intervals. The crude reaction product was purified by solution in xylene and precipitation in acetone. The results are summarized in Table XIX.

TABLE XIX

| Example | Temp °C. | PP-MAH MAH wt % | [η] dl/g |
|---|---|---|---|
| 78 | 170 | 1.0 | 1.3 |
| 79 | 180 | 1.2 | 1.0 |
| 80 | 190 | 1.3 | 1.0 |

The results in Table XIX show that the molecular weight of PP, as determined from the intrinsic viscosity, may be reduced controllably by the presence of DMAC, while at least 1 wt-% MAH is appended thereon.

EXAMPLE 81

The reaction of 40 grams amorphous atactic PP (Eastabond M-5W, Eastman Chemical Products) with 2 grams MAH (5 wt-% on PP) and 0.2 gram benzoyl peroxide (0.5 wt-% on PP) in the presence of 0.8 gram DMAC was carried out at 120° C. in the Brabender Plasticorder over a period of 10 minutes. The reaction mixture was dissolved in xylene and precipitated in acetone. The product had an MAH content of 1.0 wt-% from oxygen analysis.

Poly-l-Butene (PB)

EXAMPLES 82-83

The reaction of 40 grams molten isotactic poly-l-butene, density 0.91, with MAH and DCP in the presence of triethyl phosphite (TEPI) or DMAC, was carried out at 180° C. in the Brabender Plasticorder, as previously described. The reaction mixture was completely soluble in refluxing xylene. The MAH-modified PB was isolated by precipitation from the xylene solution into acetone. The MAH content of the product was determined by oxygen analysis. The results are summarized in Table XX.

TABLE XX

| | MAH | DCP | | Additive | | | PB-MAH | |
|---|---|---|---|---|---|---|---|---|
| Ex. | wt % on PB | wt % on MAH | wt % on PB | Nature | mole % on MAH | wt % on PB | Soluble % | MAH wt % |
| 82 | 10 | 5 | 0.5 | TEPI | 16 | 2.8 | 100 | 0.7 |
| 83 | 10 | 10 | 1.0 | DMAC | 10 | 0.9 | 100 | 0.6 |

Polyisobutylene (PIB)

EXAMPLE 84

The reaction of 40 grams polyisobutylene, viscosity average molecular weight 2,100,000 (Vistanex MM L-140, Exxon Chemical Co.) with 2 grams MAH (5 wt-% on PIB) and 0.2 gram t-butyl perbenzoate (0.5 wt-% on PIB) in the presence of 1.3 grams stearamide (22.5 mole-% on MAH), was carried out in the Brabender Plasticorder at 140° C. in the usual manner. A portion of the reaction mixture was dissolved in refluxing xylene and precipitated in acetone. The infrared spectrum of the purified polymer indicated the presence of MAH carbonyl groups and the oxygen analysis showed a 1.5 wt-% MAH content.

Poly(Ethylene-co-Propylene) (EP)

EXAMPLES 85-89

The reaction of poly(ethylene-co-propylene) elastomer, with a 40/60 E/P wt ratio and a weight average molecular weight of 113,000 (Vistalon 404, Exxon Chemical Co.), with MAH and t-butyl perbenzoate (tBPB) was carried out in the presence of DMAC, DMSO and dimethyl methylphosphonate (DMMP) at 140° C. in the Brabender Plasticorder. The reactants were added in 4 equal portions at 2 minute intervals to 40 grams fluxing polymer at 140° C. The reaction mixture was heated in refluxing xylene and filtered, when xylene-insoluble gel was present. In some cases, when the elastomer adhered to the walls of the flask, the xylene solution was decanted and replaced by additional xylene for an additional period of refluxing. The xylene solution was cooled and the MAH-modified EP was precipitated in cold acetone. The presence of MAH was shown by the 5.4 and 5.65 carbonyl peaks in the infrared spectrum while the amount of appended MAH was determined from the oxygen analysis. The results are summarized in Table XXI. Example 85 is outside of this invention and is included as a control.

TABLE XXI

| | MAH | tBPB | | Additive | | | Soluble | |
|---|---|---|---|---|---|---|---|---|
| Ex. | wt % on EP | wt % on MAH | wt % on EP | Nature | mole % on MAH | wt % on EP | MAH wt % | Insoluble % |
| 85 | 10 | 10 | 1.0 | — | 0 | 0 | 1.3 | 13 |
| 86 | 10 | 10 | 1.0 | DMAC | 9.9 | 0.9 | 1.1 | 0 |
| 87 | 10 | 10 | 1.0 | DMSO | 15.7 | 1.3 | 0.8 | 0 |
| 88 | 5 | 10 | 0.5 | DMSO | 14.8 | 0.6 | 0.9 | 0 |
| 89 | 5 | 5 | 0.25 | DMMP | 9.9 | 0.6 | 1.2 | 0 |

Example 85 demonstrates the crosslinking of EP elastomer during the reaction with MAH in the presence of tBPB. The remaining data (Examples 86-89) in Table XXI disclose the formation of soluble MAH-containing EPR in the presence of nitrogen-, phosphorous and sulfur-containing additives.

EXAMPLE 90

The reaction of 40/60 E/P elastomer with 4 grams MAH (10 wt-% on EPR) and 0.2 gram azobisisobutyronitrile (5 wt-% on MAH, 0.5 wt-% on EPR), in the presence of 0.5 gram DMSO (15.7 mole-% on MAH, 1.3 wt-% on EPR), was carried out at 140° C. in the same manner as described in Examples 85-89. The reaction mixture was completely soluble in refluxing xylene and the MAH-modified EPR was isolated from the cold xylene solution by precipitation in cold acetone. Oxygen analysis indicated an appended MAH content of 0.7 wt-%.

EXAMPLES 91-93

The reaction of 40 grams 70/30 E/P copolymer (Vistalon 707, Exxon Chemical Co.) with MAH in the presence of t-butyl perbenzoate (tBPB) at 140° C. or dicumyl peroxide (DCP) at 180° C., was carried out in the absence and in the presence of DMAC, in the Brabender Plasticorder in the manner previously described. The reaction product was heated in refluxing xylene and separated into soluble and insoluble fractions. The xylene soluble polymer was isolated by precipitation in acetone. The presence of appended MAH in the MAH-modified EP was confirmed from the carbonyl absorption peaks at 5.4 and 5.65μ in the infrared spectra of all of the polymers, The results are summarized in Table XXII. Example 92 is outside of this invention and is included as a control.

TABLE XXII

| Ex. | Temp °C. | MAH wt % on EP | Catalyst Nature | Catalyst wt % on MAH | Catalyst wt % on EP | DMAC mole % on MAH | DMAC wt % on EP | Insoluble % |
|---|---|---|---|---|---|---|---|---|
| 91 | 140 | 10 | tBPB | 10 | 1.0 | 10 | 1 | 0 0[a] |
| 92 | 180 | 5 | DCP | 10 | 0.5 | 0 | 0 | 38 |
| 93 | 180 | 5 | DCP | 10 | 0.5 | 10 | 1 | 20 |

[a]MAH content of xylene-soluble polymer 1.96 wt % from oxygen analysis

The data in the table show that completely soluble MAH-modified EP is formed with 1% tBPB at 140° C. in the presence of DMAC (Example 91). Considerable crosslinking occurs in the absence of DMAC with 0.5% DCP at 180° C. (Example 92) but this is reduced in the presence of DMAC (Example 93).

Medium Density Polyethylene

EXAMPLES 94–95

A low molecular weight (3,000) polyethylene having a density of 0.925 and a softening point of 111° C. (Epolene N-10, Eastman Chemical Products, Inc.) was reacted with MAH in the presence of tBPB and either DMAC or p-tolyl disulfide (TDS). The mixture of reactants was added in four portions at 2 minute intervals to 50 grams molten PE in the Brabender Plasticorder at 130° C. The reacmixture was completely soluble in xylene and was precipitated in acetone. The MAH content was determined from the oxygen analysis. The results are summarized in Table XXIII.

TABLE XXIII

| Ex. | MAH wt % on PE | tBPB wt % on MAH | tBPB wt % on PE | Additive Nature | Additive mole % on MAH | Additive wt % on PE | Soluble MAH wt % |
|---|---|---|---|---|---|---|---|
| 94 | 10 | 10 | 1.0 | DMAC | 10 | 1.0 | 0.6 |
| 95 | 8 | 5 | 0.4 | TDS | 7.4 | 1.5 | 0.5 |

Poly(Ethyl Acrylate) (PEA)

EXAMPLE 96

Poly(ethyl acrylate) was prepared by emulsion polymerization at 50° C. using an ammonium persulfate-sodium metabisulfite redox catalyst system. The polymer was precipitated with aqueous sodium chloride solution and, after washing with water, was dried in vacuo.

The reaction of 40 grams PEA with 4 grams MAH (10 wt-% on PEA) and 0.4 gram tBPB (10 wt-% on MAH, 1 wt-% on PEA) in the presence of 0.8 gram DMAC (2 wt-% on PEA) was carried out in the Brabender Plasticorder at 140° C. over a 10 minute period, in the usual manner. The reaction product was completely soluble in refluxing dioxane and was isolated by precipitation into water. Due to the strong, broad ester absorption peak centered at 5.8μ, the presence of appended MAH could not be confirmed from the infrared spectrum. However, when diethylene triamine was added to a xylene solution of the MAH-treated PEA, the solution immediately thickened. In contrast, the addition of the amine to a solution of untreated PEA had no effect on the solution viscosity.

Poly(Vinyl Chloride) (PVC)

EXAMPLE 97

A mixture of 50 grams suspension grade poly(vinyl chloride) (Geon G-30, B. F. Goodrich Co.) and 0.5 gram dibutyltin bis(isooctyl metcaptoacetate) stabilizer (Thermolite 31, M&T Chemicals) was charged into the Brabender Plasticorder, preheated to 235°–240° C., under a nitrogen atmosphere. A mixture of 2.5 grams MAH (5 wt-% on PVC), 1.0 gram DCP (40 wt-% on MAH, 2 wt-% on PVC) and 0.6 gram DMSO (10 mole-% on MAH, 1.2 wt-% on PVC) was added to the fluxing PVC in 4 equal portions at 2 minute intervals. A 5 gram portion of the reaction product was heated overnight in refluxing tetrahydrofuran (THF). The product was completely soluble in THF and, after precipitation in 800 ml hexane, was dried in vacuo. The infrared spectrum of the MAH-modified PVC, cast from the THF solution, showed the MAH carbonyl absorption peaks at 5.4 and 5.65μ. Based on the oxygen analysis, the MAH content was 3.1 wt-%.

Polyolefin Thermoplastic Elastomer

EXAMPLES 98–100

The reaction of 2.0 grams MAH with either 40 grams poly(ethylene-co-propylene-co-1,4-hexadiene) EPDM (Nordel 1040, E. I. duPont de Nemours & Co.) containing 2.1% unsaturation, or a blend of 32 grams EPDM and 8 grams isotactic polypropylene (Profax 6523, Hercules Co.), in the presence of 0.16 gram DCP and, in the absence or presence of 0.85 gram stearamide (SA), was carried out at 180° C., by the addition of the MAH-DCP-SA mixture to the polymer fluxing at 60 rpm in the Brabender Plasticorder, in 4 equal portions at 2 minute intervals. Total reaction period including 2 minute fluxing of the polymer before the addition of the additives and 2 minutes after the last addition was 10 minutes.

A 5 gram sample of the reaction product, in pea size pieces, was extracted in 250 ml cyclohexane for 48 hours at an ambient temperature of 25°–30° C. The cyclohexane-insoluble fraction was removed by filtration, washed with acetone, and dried in vacuo at 70° C. The cyclohexane-soluble fraction was precipitated in acetone, filtered and dried in vacuo at 70° C.

The results are summarized in Table XXIV. Examples 98 and 99 are outside of the invention and are included as controls.

TABLE XXIV

| Ex. | Blend EPDM % | Blend PP % | MAH wt % on blend | DCP wt % on MAH | DCP wt % on blend | Stearamide mole % on MAH | Stearamide wt % on blend | Soluble % | Insoluble % |
|---|---|---|---|---|---|---|---|---|---|
| 98 | 100 | 0 | 5 | 8 | 0.4 | 0 | 0 | 12 | 78 |
| 99 | 80 | 20 | 5 | 8 | 0.4 | 0 | 0 | 24 | 70 |
| 100 | 80 | 20 | 5 | 8 | 0.4 | 14.7 | 2.1 | 38 | 56 |

Infrared spectra of the cyclohexane-soluble fractions from the reactions of MAH with the EPDM-PP blends (Examples 99 and 100) showed the carbonyl absorption peaks of MAH at 5.4 (weak), 5.65 (strong) and 5.8μ (weak), as well as peaks indicative of the presence of both EDPM and PP. The spectra of the cyclohexane-insoluble fractions showed the presence of the MAH and EPDM absorption peaks at 5.65 and 13.8μ, respectively. Thus, both soluble and insoluble fractions contained appended MAH. Example 98 shows the extent of crosslinking of EPDM in the presence of MAH and DCP. Example 99 shows the decrease in crosslinking of EPDM, concurrent with the reaction of MAH with PP. Example 100 shows the further decrease in crosslinking, leading to improved processibility, in the presence of SA.

Although the examples given hereinbefore illustrate the use of the Brabender Plasticorder in carrying out the process of this invention, it is to be understood that these are illustrative embodiments and that any equipment capable of mixing the molten polymer and exposing the surface thereof to the MAH-initiator-additive mixture may be used. Suitable mixing equipment including extruders, mills and any mechanical mixing equipment useful in the mixing, compounding, processing or fabrication of polymers will be obvious to those skilled in the art.

Since the additives which are used in suppressing the crosslinking or degradation of the polymer during reaction with maleic anhydride are not conventional radical inhibitors, as evidenced by the ease of polymerization of methyl methacrylate in their presence, but do inhibit maleic anhydride homopolymerization, it is probable that the carboxyl groups are appended to the substrate polymer in the form of oligomeric or even individual maleic anhydride and/or succinic anhydride units.

The carboxyl-containing polymers produced by the practice of the process of this invention may be used per se or may be blended in all proportions with unmodified substrate polymers to provide blends with different carboxyl contents.

Conventional additives can be used with the maleic anhydride-modified polymers. These include heat stabilizers, antioxidants, antiozonants, antistatic agents, slip agents, antiblocking agents, dyes, pigments, flame retardants, smoke suppressants, plasticizers, processing aids and the like.

The carboxyl-containing polymers may be melt extruded into films, sheets, tubes, fibers, profiles and other shapes. The films or sheets can be readily printed or decorated, laminated to rigid or flexible substrates such as wood, paper, metals thermoset polymers, other thermoplastic films, elastomeric sheeting, etc., used as adhesive films between plies in a multi-ply composite, e.g. wood-wood, wood-metal, metal-metal, as well as thermoplastic or thermoset polymer composites with wood, metal, glass, woven or nonwoven fabrics or mats, paper, etc., pressure or vacuum-formed, stretched, oriented, heat-shrunk, vacuum metallized, coated with heat-sealable and/or barrier coating compositions. The presence of carboxyl groups in the polymer film in most cases will make it unnecessary to treat the film surface, e.g. by corona or electrical discharge or flame, or apply an adhesive costing to promote adhesion or printability. The presence of carboxyl groups promotes adhesion to functional groups in other polymers, e.g. ethylene-vinyl alcohol copolymers, i.e. hydrolyzed poly(ethylene-co-vinyl acetate), nylon, poly(vinyl chloride-co-vinylidene chloride), poly(ethylene terephthalate), acrylonitrile-containing barrier polymers, etc.

The carboxyl-containing polymers may also be converted into films or sheets by calendering and flat-bed pressing. The incorporation of blowing agents permits the production of foamed film or sheeting.

The fibers produced from the maleic anhydride-containing polymers by melt spinning or film splitting may be converted into woven or non-woven structures. Due to the presence of carboxyl groups, the non-woven webs or mats have greater strength than the webs or mats produced from the unmodified polymers and, in many cases, e.g. carboxyl-containing polyolefins such as polyethylene or polypropylene, have paper-like characteristics. Both woven and non-woven structures may be coated or printed with conventional paper or textile coating and printing compositions to yield coated structures with good coating-substrate adhesion.

Chopped or melt-spun short fibers from the carboxyl-containing polymers have hydrophilic surfaces and may be blended with wood pulp or other hydrophilic fibers and converted into sheets. The fibers may also be incorporated into polyurethanes including foams during their formation, to provide reinforcement or compression resistance.

The carboxyl-containing fibers per se or in the form of woven or non-woven structures are readily dyed with basic dyes, metal-containing dyes and "reactive" dyes. The dyes may be incorporated in the polymer melt before spinning or extrusion.

The dyed or natural fiber mats or woven shapes may be laminated to substrates such as metals, wood, natural or synthetic fibers or film structures, etc. and yield composites with good interfacial adhesion.

The presence of carboxyl groups in the maleic anhydride-containing polymers increases the adhesion and compatibility with fibrous and non-fibrous, inorganic or organic fillers and reinforcements such as silicates (clay, talc, mica, asbestos, wollastonite, feldspar, nepheline syenite, fuller's earth, pumice, pyrophillite, vermiculite, calcium silicate and magnesium silicate), oxides (aluminum oxide, hydrated alumina, antimony trioxide, magnesium oxide, titanium dioxide, zinc oxide, quartz, diatomaceous earth, sand, tripoli, pyrogenic silica, silica hydrogel and silica aerogel), carbonates (calcium, barium and magnesium carbonates), sulfates (barium and calcium sulfates), hydroxides (calcium and magnesium hydroxides), carbon black, graphite, carbon fibers, metal powder, fibers, whiskers and wire, barium ferrite, magnetite, molybdenum disulfide, as well as glass fibers, powder, flake or microspheres, lignin, ground bark, rice hulls, keratin, wood flour, shell flours, and organic fibers and powders, including nylon, acrylic, fluorocarbon, polyester, poly(vinyl acetate), polyethylene, rayon, cellulose, cotton flock, jute, sisal and the like.

The fillers may be blended with the carboxyl-containing polymers prior to extrusion or molding. However, a particularly advantageous modification of the present invention consists in carrying out the reaction of maleic anhydride and the molten polymer in the presence of the radical catalyst, the nitrogen-, phosphorous- or sulfur-containing additive and the filler or reinforcement. Thus, the maleic anhydride, catalyst and the additive which inhibits the homopolymerization of maleic anhydride are added to a mixture of the molten polymer and the filler or reinforcement. The resultant mixture is then extruded and pelletized for subsequent fabrication into a shaped object or injection molded directly into a shaped object.

The carboxyl-containing polymers may be crosslinked by treatment with suitable polyvalent metal compounds, e.g. zinc acetate, basic aluminum acetate, zirconium acetylacetonate. The crosslinking reaction is carried out by treating the film, fiber or shaped object prepared from the carboxyl-containing polymer with an aqueous or organic solution of the metal compound. The carboxyl-containing polymer may also be compounded with metal oxides such as zinc oxide, magnesium oxide or lead oxide and extruded or molded into crosslinked shaped objects.

Crosslinking of the maleic anhydride-containing polymer with a metal slat of a weak acid, preferably a divalent Group II metal salt of a weak acid, including metal oxides such as magnesium or zinc oxide, and metal salts of weak carboxylic acids, phenoxides and $\beta$-diketones results in the formation of a thermally reversible crosslink. Accelerators containing an active hydrogen atom, including water, organic acids, amines, alcohols, phenols and the like accelerate the rate of cure of the metal oxide-containing systems. When the substrate polymer is an elastomer, the product is a thermoplastic elastomer with reversible crosslinks which can be molded or extruded and then reshaped by exposure to elevated temperatures. Permanent crosslinking results from the use of polyfunctional curing agents such as diamines or polyols.

Treatment of the carboxyl-containing polymers with monovalent compounds such as sodium hydroxide, potassium hydroxide or lithium hydroxide may be carried out by contacting the polymer with the solid inorganic compound or with an aqueous solution thereof. The resulting salt form of the carboxyl-containing polymer has increased strength as well as modified properties, e.g. increased water vapor permeability. The salt form can be extruded or molded into shaped objects.

Treatment of the carboxyl-containing polymer with a monovalent metal hydroxide, e.g. sodium hydroxide or ammonium hydroxide, or with an organic amine such as triethylamine or ethanolamine, increases the water dispersibility. Aqueous dispersions prepared therefrom may be coated on substrates such as paper, wood or metal as well as fibers and, after drying, yield coated substrates with strongly adherent coatings.

The carboxyl-containing polymers may be converted into fine powders and used in the fluid bed coating of heated substrates, metal objects, to give adherent coatings. The powdered carboxyl-containing polymers may also be dispersed readily in aqueous amine or inorganic base solutions.

The carboxyl-containing polymers are polyanionic in nature and may be combined with polycationic polymers to yield polyelectrolyte complexes. The latter are insoluble in water but are solubilized in simple electrolyte solutions, e.g. lithium chloride. In this form or as electrolyte-containing water-swollen gels, they may be converted into membranes which are useful in dialysis and selective filtration.

The uncrosslinked or partially crosslinked or neutralized carboxyl-containing polymers of the present invention have sites which can be used for reaction with various reactive monomers or polymers. Thus, the carboxyl and/or anhyride groups can be used to react with epoxy-containing monomers, e.g. glycidyl methacrylate, or to cure epoxy resins. When the carboxyl-containing polymer is elastomeric, this will result in the formation of an impact-modified epoxy resin.

The carboxyl and/or anhydride groups can be used to react with terminal or pendant amine groups in a low molecular weight polyamide as well as in a high molecular weight polyamide such as 6-nylon, 6,6-nylon, aramid and the like. When the carboxyl-containing polymer is an elastomer, the result is a tough, thermoplastic composition.

The carboxyl groups can also be utilized as grafting sites for reaction with epoxides, lactones and the like.

The reactions and applications of carboxyl and/or anhydride-containing random, alternating, block or graft copolymers are well known to those skilled in the art and are applicable to the maleic anhydride-modified polymers of the present invention.

The following examples are illustrative of the properties and some of the applications of the MAH-containing products of the process of the present invention. Other applications, in addition to those mentioned herein before and after, will be obvious to those skilled in the art.

EXAMPLE 101

A comparison of the properties of films prepared from untreated LDPE (Chemplex 1014) and MAH-modified LDPE containing 2 wt-% appended MAH is shown in Table XXV. The 16–18 mil films were prepared between Teflon sheets, by compression molding in a hydraulic press at 280° F. under 30,000 psig pressure, with 6 minutes contact time and 2 minutes pressing time. The tensile properties were determined in accordance with ASTM D638-72.

TABLE XXV

| Polymer | LDPE | LDPE-MAH |
|---|---|---|
| Yield strength, psi | 1340 | 1320 |
| Break strength, psi | 1415 | 1470 |
| Elongation at break, % | 208 | 210 |
| Elastic modulus, psi | 5815 | 5770 |

EXAMPLE 102

The tensile properties of films of untreated PP (Profax 6523) and MAH-modified PP having an intrinsic viscosity of 1.6 dl/g and an appended MAH content of 1 wt-%, were essentially the same and are shown in Table XXVI. The 15 mil films were prepared between Teflon sheets by compression molding at 400° F. under 30,000 psig pressure with a 5 minute contact time and a 2 minute pressing time.

TABLE XXVI

| Polymer | PP | PP-MAH |
|---|---|---|
| Break strength, psi | 5280 | 5375 |
| Elongation at break, % | 14 | 14 |
| Elastic modulus, psi | 38410 | 39085 |

EXAMPLE 103

The peel strength of adhesive bonds between aluminum foil and untreated LDPE (Chemplex 1014), MAH-modified LDPE having a 1.2 wt-% MAH content and a commercial ethylene-acrylic acid copolymer (E-AA) (Dow 435, Dow Chemical Co.) having a 3.5 wt-% acrylic acid content, was measured using the molten polymer in the preparation of Al/polymer/Al laminates. The latter were prepared by placing 1.5 grams powdered polymer between two pieces of 1 mil thick 4×8 inch aluminum foil and heating the sandwich in a press at 280° F. with a 5 minute contact time and a 2 minute pressing time at 10,000 psig. The polymer coverage was 12 mg/sq cm. The peel strength of 1 inch wide laminates, i.e. the load required to separate progressively one piece of foil from the polymer over the adhered surface at a separation angle of 180° and a separation rate of 8 inches per minute, was measured by a modification of ASTM D903 and are summarized in Table XXVII.

TABLE XXVII

| Polymer | Peel strength grams/inch of width |
|---|---|
| LDPE | 50 |
| LDPE-MAH | 610 |
| E-AA | 610 |

EXAMPLE 104

The peel strength of adhesive bonds between aluminum foil and untreated PP and MAH-modified PP with 1.0 wt-% appended MAH was measured using Al/PP-/Al laminates prepared at 400° F., as described in Example 103. The aluminum foil was 1 ml thick and the polymer coverage was 7 mg/sq cm. Similar laminates were prepared with 2 mil copper foil with a polymer coverage of 2.5 mq/sq cm. The peel strengths are summarized in Table XXVIII.

TABLE XXVIII

| Polymer | Peel strength grams/inch of width | |
|---|---|---|
| | Aluminum | Copper |
| PP | 45 | 45 |
| PP-MAH | 1620 | 1485 |

EXAMPLE 105

Crosslinked MAH-modified PP was prepared by heating a solution of 15 grams of PP containing 1.0 wt-% appended MAH and 0.67 gram zinc acetate dihydrare in a mixture of 240 ml toluene and 60 ml dimethylformamide for 4 hours at 80° C. Some precipitation was noted during the heating period. The polymer precipitated on the addition of 800 ml acetone to the cooled reaction mixture. The polymer was filtered, washed several times with acetone and dried at 60° C.

A 5 gram portion of the zinc ion crosslinked MAH-modified PP was heated in 200 ml refluxing xylene for 4 hours, with periodic scraping of the adhered polymer from the sides of the flask. The hot suspension was filtered through cheese cloth. The xylene-insoluble gel and the xylene-soluble polymer, the latter isolated by precipitation in acetone, were dried at 60° C. The xylene-insoluble fraction constituted 84% of the total polymer. Under the same conditions, untreated PP and uncrosslinked MAH-modified PP were completely soluble in refluxing xylene.

The tensile properties of 14 mil films of uncrosslinked MAH-modified PP and zinc acetate-crosslinked MAH-modified PP, prepared at 400° F., were essentially the same and as shown in Table XXVI.

EXAMPLE 106

The crosslinking of MAH-containing poly(ethylene-co-methyl acrylate) (Poly-Eth 2205, 80/20 E/MA, Gulf Oil Chemicals Co.) was carried out in a similar manner to that described in Example 105. A solution of 0.22 gram zinc acetate dihyrate in a mixture of 16 ml toluene and 4 ml dimethylformamide was added to a preheated solution of 20 grams MAH-modified E-MA containing 1.9 wt-% appended MAH in a mixture of 160 ml toluene and 40 mll dimethylformamide at 80° C. The crosslinked polymer precipitated immediately from the solution. After 30 minutes at 80° C., the gel was removed by filtration, washed with water and dried.

The zinc acetate-crosslinked MAH-modified E-MA was completely insoluble in refluxing xylene, in contrast to the complete solubility of the uncrosslinked MAH-modified E-MA and untreated E-MA.

Films compression molded at 280° F. under 30,000 psig from the ionic crosslinked MAH-containing E-MA had a tensile strength of 1700 psi and an elongation of 430%. The pressed film of crosslinked polymer was cut into small pieces and again compression molded at 280° F. under 30,000 psig pressure. The re-pressed film had a tensile strength of 1840 psi and an elongation of 475%, indicating the thermal reversibility of the ionic crosslinks.

EXAMPLES 107-108

A 35 gram charge of LDPE (Chemplex 1014) was fluxed in the mixing chamber of the Brabender Plasticorder at 180° C. A total of 12 grams clay (Hydrite 10, Georgia Kaolin Co.) or ¼ inch chopped glass fibers (Owens-Illinois Fiberglas Corp.) was slowly added and mixing was continued for 2 minutes. A mixture of 3.5 grams MAH, 0.35 gram DCP and 1.01 grams stearamide was added to the fluxing LDPE-filler mixture in 4 portions at 2 minute intervals. The mixture was removed from the mixing chamber after a total heating time of 12 minutes.

Films were prepared by compression molding at 280° F. with 6 minutes contact time and 2 minutes under 30,000 psig pressure. The properties are summarized in Table XXIX.

TABLE XXIX

| Example | 107 | 108 |
|---|---|---|
| Filler | Clay | Glass |
| Break strength, psi | 1375 | 2265 |
| Elongation, % | 39 | 5 |
| Elastic modulus, psi | 3580 | 45585 |

EXAMPLE 109

A mixture of 5 grams MAH, 1.45 grams stearamide and 0.5 gram DCP was ground to a fine powder and then mixed with 0.2 gram mineral oil. The resulting paste was transferred to a plastic container, 50 grams LDPE pellets were added, and the lid was placed on the container which was shaken until the pellets were uniformly coated with the mixture. The coated pellets were charged into the Brabender Plasticorder which was preheated to 180° C. and mixing was conducted for 5 minutes before the mixing chamber was emptied. A 5 gram aliquot of the product was completely soluble in 250 ml refluxing xylene and was precipitated by the addition of acetone. The MAH content of the product, determined by titration, was 1.4 wt-%.

EXAMPLE 110

A mixture of 4.5 grams MAH, 1.5 gram stearamide and 0.9 gram DCP was ground to a fine powder and then mixed thoroughly with 45 grams PP (Profax 6523) which had been ground to 20 mesh size. The mixture was charged into the Plasticorder which was preheated to 180° C. under a nitrogen atmosphere. After 8 minutes of mixing, the product was removed from the chamber and an aliquot was heated in refluxing xylene and filtered into acetone. The isolated product had an MAH content of 1.4 wt-%, based on the infrared spectrum, and an intrinsic viscosity of 1.5 dl/g in decalin at 135° C.

What is claimed is:

1. A process for preparing carboxyl-containing polymers with decreased crosslinking and/or degradation which comprises mixing together (1) maleic anhydride, (2) a free radical initiator, (3) an additive which inhibits the homopolymerization of maleic anhydride but not that of methyl methacrylate at below about 100° C., and (4) a polymer undergoing deformation in bulk or in the melt at a temperature where the free radical initiator has a half life of less than 3 hours and undergoes decomposition during the mixing, and where said polymer is obtained from at least one ethylenically unsaturated monomer selected from the group consisting of olefins, diolefins, unsaturated esters and vinyl chloride.

2. The process of claim 1 wherein the free radical initiator is selected from the group consisting of organic peroxygen compounds and azo compounds.

3. The process of claim 2 wherein the organic peroxygen compound is selected from the group consisting of peroxides, hydroperoxides, ketone peroxides and peroxyesters.

4. The process of claim 1 wherein the additive is selected from the group consisting of nitrogen-, phosphorous- and sulfur-containing compounds.

5. The process of claim 4 wherein the nitrogen-containing compound is selected from the group consisting of carboxylic acid amides, lactams, N,N-disubstituted aromatic amines and amine oxides.

6. The process of claim 5 wherein the amide is an unsubstituted fatty acid amide.

7. The process of claim 5 wherein the amide is N,N-dimethylformamide.

8. The process of claim 5 wherein the amide is N,N-dimethylacetamide.

9. The process of claim 5 wherein the lactam is caprolactam.

10. The process of claim 5 wherein the lactam is pyrrolidone or a substituted pyrrolidone.

11. The process of claim 5 wherein the aromatic amine is N,N-dimethylaniline.

12. The process of claim 5 wherein the amine oxide is a pyridine-N-oxide.

13. The process of claim 4 wherein the phosphorous-containing compound is selected from the group consisting of esters and amides of unsubstituted and substituted phosphorous, phorphoric, phosphonous, phosphinous, phosphonic and phosphinic acids and phosphine oxides.

14. The process of claim 13 wherein the ester of substituted phosphorous acid is diphenyl phosphite.

15. The process of claim 13 wherein the ester of phosphorous acid is triethyl or triphenyl phosphite.

16. The process of claim 13 wherein the ester of phosphorous acid is an alkyl diaryl phosphite.

17. The process of claim 13 wherein the ester of phosphorous acid is a tri (alkylated aryl) phosphite.

18. The process of claim 13 wherein the ester of phosphoric acid is a trialkyl phosphate.

19. The process of claim 13 wherein the ester of phosphoric acid is triphenyl phosphate.

20. The process of claim 13 wherein the amide of phosphoric acid is hexamethylphosphoramide.

21. The process of claim 13 wherein the ester of a substituted phosphonic acid is dimethyl methylphosphonate.

22. The process of claim 13 wherein the phosphine oxide is triphenylphosphine oxide.

23. The process of claim 4 wherein the sulfur-containing compound is selected from the group consisting of disulfides and sulfoxides.

24. The process of claim 23 wherein the disulfide is p-tolyl disulfide.

25. The process of claim 23 wherein the disulfide is 2-benzothiazyl disulfide.

26. The process of claim 23 wherein the sulfoxide is dimethylsulfoxide.

27. The process of claim 1 wherein the polymer is a homopolymer of ethylene.

28. The process of claim 27 wherein the homopolymer of ethylene is low density polyethylene.

29. The process of claim 27 wherein the homopolymer of ethylene is medium density polyethylene.

30. The process of claim 27 wherein the homopolymer of ethylene is high density polyethylene.

31. The process of claim 1 wherein the polymer is a copolymer of ethylene and a polar monomer.

32. The process of claim 31 wherein the polar monomer is vinyl acetate.

33. The process of claim 31 wherein the polar monomer is an acrylic ester.

34. The process of claim 1 wherein the polymer is a copolymer of ethylene and an α-olefin.

35. The process of claim 34 wherein the polymer is thermoplastic and the α-olefine is propylene.

36. The process of claim 34 wherein the α-olefin is 1-butene.

37. The process of claim 34 wherein the α-olefin is 1-hexane.

38. The process of claim 1 wherein the polymer is a homopolymer of propylene.

39. The process of claim 38 wherein the homopolymer of propylene is crystalline, isotactic polypropylene.

40. The process of claim 38 wherein the homopolymer of propylene is amorphous polypropylene.

41. The process of claim 1 wherein the polymer is a copolymer of propylene and an α-olefin other than ethylene.

42. The process of claim 34 wherein the polymer is elastomeric and the α-olefin is propylene.

43. The process of claim 41 wherein the α-olefin is 1-butene.

44. The process of claim 1 wherein the polymer is a homopolymer of 1-butene.

45. The process of claim 1 wherein the polymer is a homopolymer of isobutylene.

46. The process of claim 42 wherein the elastomeric copolymer of ethylene and propylene contains up to about 5% unsaturation derived from a diene or triene comonomer.

47. The process of claim 1 wherein the polymer is a homopolymer of an acrylic or vinyl ester.

48. The process of claim 1 wherein the polymer is a copolymer of an acrylic or vinyl ester with one or more polar monomers.

49. The process of claim 1 wherein the polymer is a blend of an olefin homopolymer and a copolymer of two or more α-olefins.

50. The process of claim 49 wherein the olefin homopolymer is polyethylene.

51. The process of claim 49 wherein the olefin homopolymer is polypropylene.

52. The process of claim 49 wherein the olefin homopolymer is poly-1-butene.

53. The process of claim 49 wherein the olefin copolymer is an uncrosslinked copolymer of ethylene and propylene.

54. The process of claim 49 wherein the olefin copolymer is a partially crosslinked copolymer of ethylene and propylene.

55. The process of claim 49 wherein the olefin copolymer is a fully crosslinked copolymer of ethylene and propylene.

56. The process of claim 49 wherein the olefin copolymer contains up to 5% unsaturation.

57. The process of claim 1 wherein the polymer is a blend of two or more α-olefin homopolymers.

58. The process of claim 1 wherein the polymer is a blend of an α-olefin homopolymer and a copolymer of an α-olefin with one or more polar monomers.

59. The process of claim 58 wherein the polar monomer is vinyl acetate.

60. The process of claim 58 wherein the polar monomer is an acrylic ester.

61. The process of claim 1 wherein the polymer is the homopolymer of vinyl chloride.

62. The process of claim 1 wherein the polymer is a graft copolymer of polybutadiene with one or more non-polar monomers.

63. The process of claim 1 wherein the polymer is a graft copolymer of polybutadiene with one or more polar monomers.

64. The process of claim 1 wherein maleic anhydride is replaced by maleic acid.

65. A process for preparing carboxyl-containing polymers with decreased crosslinking and/or degradation which comprises (a) adding intermittently or continuously a mixture of (1) maleic anhydride, (2) a free radical initiator, and (3) an additive which inhibits the homopolymerization of maleic anhydride but not that of methyl methacrylate below about 100° C., to a polymer undergoing deformation in bulk or in the melt, and (b) mixing the reactants at a temperature where the free radical initiator has a half life of less than 3 hours and undergoes decomposition during the mixing, wherein said polymer is obtained from at least one ethylenically unsaturated monomer selected from the group consisting of olefins, diolefins, unsaturated esters and vinyl chloride.

66. The process of claim 65 wherein the maleic anhydride is replaced by maleic acid.

67. The process of claim 66 wherein the temperature is above the melting point of the polymer.

68. The process of claim 67 wherein the filler is clay.

69. The process of claim 67 wherein the reinforcement is glass fibers.

* * * * *